(12) United States Patent
Woo (10) Patent No.: US 11,975,335 B2
(45) Date of Patent: May 7, 2024

(54) SUPER ABSORBENT POLYMER HYDROGEL SHREDDING DEVICE

(71) Applicant: LG Chem, Ltd., Seoul (KR)

(72) Inventor: Heechang Woo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 372 days.

(21) Appl. No.: 17/608,030

(22) PCT Filed: May 12, 2020

(86) PCT No.: PCT/KR2020/006215
§ 371 (c)(1),
(2) Date: Nov. 1, 2021

(87) PCT Pub. No.: WO2021/054564
PCT Pub. Date: Mar. 25, 2021

(65) Prior Publication Data
US 2022/0203375 A1    Jun. 30, 2022

(30) Foreign Application Priority Data

Sep. 19, 2019  (KR) .................. 10-2019-0115487
Apr. 27, 2020  (KR) .................. 10-2020-0050855

(51) Int. Cl.
*B02C 18/22* (2006.01)
*B02C 18/10* (2006.01)
(Continued)

(52) U.S. Cl.
CPC .......... *B02C 18/2258* (2013.01); *B02C 18/10* (2013.01); *B02C 18/2216* (2013.01); *B02C 18/24* (2013.01); *B29B 7/426* (2013.01)

(58) Field of Classification Search
CPC . B02C 18/2258; B02C 18/22; B02C 18/2225; B02C 18/30; B02C 18/301;
(Continued)

(56) References Cited

U.S. PATENT DOCUMENTS

| 4,446,261 A | 5/1984 | Yamasaki et al. |
| 2005/0046069 A1 | 3/2005 | Sasabe et al. |
| (Continued) | | |

FOREIGN PATENT DOCUMENTS

| CN | 201002042 Y | 1/2008 |
| CN | 204354342 U | 5/2015 |
| (Continued) | | |

OTHER PUBLICATIONS

Extended European Search Report including Written Opinion for Application No. 20864628.1 dated May 3, 2022, pp. 1-8.
(Continued)

*Primary Examiner* — Bobby Yeonjin Kim (57) ABSTRACT

Disclosed is a hydrogel shredding device. The hydrogel shredding device includes: a first barrel body in which a first transfer space for transferring a hydrogel is formed, and extending in a first direction; a first transfer unit installed in the first barrel body and transferring the hydrogel in the first transfer space; a second barrel body installed on a lateral side of the first barrel body, and in which a second transfer space connected to the first transfer space extends in a second direction traversing the first direction; a second transfer unit installed in the second barrel body and transferring the hydrogel in the second transfer space; a cutter member installed in the second barrel body and pulverizing the hydrogel transferred by the second transfer unit; and a porous plate for discharging the hydrogel particles pulverized by the cutter member to an outside of the second barrel body.

10 Claims, 10 Drawing Sheets

(51) Int. Cl.
   *B02C 18/24* (2006.01)
   *B29B 7/42* (2006.01)
(58) Field of Classification Search
   CPC .......... B29B 7/42; B29B 7/426; B29B 7/422;
                 B29B 7/428; B29B 9/06; B29B 9/16
   See application file for complete search history.

(56) References Cited

U.S. PATENT DOCUMENTS

| | | |
|---|---|---|
| 2006/0137580 A1 | 6/2006 | Miyoshi et al. |
| 2011/0034655 A1 | 2/2011 | Weismantel et al. |
| 2016/0199529 A1 | 7/2016 | Torii et al. |
| 2017/0081442 A1 | 3/2017 | Johnson et al. |
| 2017/0216817 A1 | 8/2017 | Torii et al. |

FOREIGN PATENT DOCUMENTS

| | | | |
|---|---|---|---|
| CN | 204869324 U | * | 12/2015 |
| CN | 204869324 U | | 12/2015 |
| CN | 206030293 U | * | 3/2017 |
| CN | 206030293 U | | 3/2017 |
| CN | 207327544 U | | 5/2018 |
| CN | 207566348 U | | 7/2018 |
| CN | 207736564 U | * | 8/2018 |
| CN | 207736564 U | | 8/2018 |
| CN | 209241964 U | | 8/2019 |
| GB | 2301795 A | * | 12/1996 ......... B29B 17/0042 |
| JP | S56161408 A | | 12/1981 |
| JP | S57158209 A | | 9/1982 |
| JP | S57198714 A | | 12/1982 |
| JP | S61154810 A | | 7/1986 |
| JP | H09040416 A | | 2/1997 |
| JP | 2005096448 A | | 4/2005 |
| JP | 2007506927 A | | 3/2007 |
| JP | 2011518929 A | | 6/2011 |
| JP | 2018527453 A | | 9/2018 |
| KR | 200410208 Y1 | | 3/2006 |
| KR | 20100031399 A | | 3/2010 |
| KR | 20120114062 A | | 10/2012 |
| KR | 101586465 B1 | | 1/2016 |
| KR | 20160048843 A | | 5/2016 |
| KR | 20170063818 A | | 6/2017 |
| WO | 2015030130 A1 | | 3/2015 |
| WO | 2021075921 A1 | | 4/2021 |

OTHER PUBLICATIONS

International Search Report for Application No. PCT/KR2020/006215 dated Aug. 24, 2020, 3 Pages.
Search Report dated Jul. 11, 2022 from Office Action for Chinese Application No. 202080030016 dated Jul. 18, 2022. 3 pgs.

* cited by examiner

SUPER ABSORBENT POLYMER HYDROGEL SHREDDING DEVICE

CROSS-REFERENCE TO RELATED APPLICATIONS

The present application is a national phase entry under 35 U.S.C. § 371 of International Application No. PCT/KR2020/006215, filed on May 12, 2020, which claims priority to Korean Patent Application No. 10-2020-0050855, filed on Apr. 27, 2020, and Korean Patent Application No. 10-2019-0115487, filed on Sep. 19, 2019, the entire contents of which are incorporated herein by reference.

TECHNICAL FIELD

The present invention relates to a superabsorbent polymer hydrogel shredding device for uniformly shredding a hydrogel.

BACKGROUND ART

A superabsorbent polymer (SAP) represents a synthesized polymer material having the function of absorbing moisture that at 500 to 1000 times its own weight, and its manufacturers call it a superabsorbent material (SAM) or an absorbent gel material (AGM). The superabsorbent polymer started being commercialized as menstrual appliances, and it is currently in wide use as hygiene products such as paper diapers, soil repairing agents for gardening, water stops for public works, sheets for raising seedlings, freshness retainers in the food distribution field, and materials for steaming.

Methods for manufacturing the above-noted superabsorbent polymer include an inverse suspension polymerization based method and a solution polymerization based method. The inverse suspension polymerization is disclosed in, for example, Japanese Published Patents 56-161408, 57-158209, and 57-198714. The solution polymerization based method includes a heat polymerization method for breaking, cooling, and polymerizing hydrogel polymers in a kneader with a plurality of shafts, and a photopolymerization method for simultaneously polymerizing and drying an aqueous solution at high concentration on a belt by irradiating ultraviolet rays.

The hydrogel or the hydrogel polymer obtained through the above-noted polymerization reaction is generally pulverized by a drying process and is then sold as a powder. To perform the drying step efficiently, it is important to increase a surface area of the hydrogel polymer to be as big as possible. Therefore, to increase the surface area of the hydrogel polymer to be as big as possible before performing the drying process, a method for increasing the surface area of the hydrogel polymer to be dried by easily pulverizing the hydrogel polymer polymerized by heat polymerization or photopolymerization may be considered. To increase the surface area of the hydrogel polymer as described above, a process for polymerizing the hydrogel polymer and pulverizing it in the first place is disclosed.

A chopper is generally used in the first process for pulverizing the hydrogel.

The chopper includes a screw for moving the hydrogel, a barrel including spirals, a cutter blade for cutting the hydrogel, and a porous plate for discharging the cut hydrogel.

Regarding the conventional chopper, a moving direction of hydrogel particles input to the barrel and the screw is horizontal. Therefore, pressure given to the hydrogel particles on the porous plate disposed position is not uniform, and applied pressure at a lower position of the barrel becomes greater than that at an upper position, so it is not uniformly shredded on the porous plate.

As described above, when the shredded hydrogel particles do not have a constant size, the particles are dried non-uniformly in the process for drying the hydrogel, so overdried or undried grains may be formed.

Here, the overdried portion of the hydrogel may generate many fine particles in the process for manufacturing a superabsorbent polymer, and may generate troubles in the manufacturing process. Further, the undried portion of the hydrogel may make it difficult to fluently manufacture a superabsorbent polymer in the process such as pulverization or sorting as well as deteriorating the physical property of the manufactured superabsorbent polymer.

The above information disclosed in this Background section is only for enhancement of understanding of the background of the invention, and therefore it may contain information that does not form the prior art that is already known in this country to a person of ordinary skill in the art.

DISCLOSURE

The present invention has been made in an effort to provide a superabsorbent polymer hydrogel shredding device for uniformly shredding a hydrogel and improving manufacturing quality of a superabsorbent polymer.

An embodiment of the present invention provides a hydrogel shredding device including: a first barrel body in which a first transfer space for transferring a hydrogel is formed, and extending in a first direction; a first transfer unit installed in the first barrel body and transferring the hydrogel in the first transfer space; a second barrel body installed on a lateral side of the first barrel body, and in which a second transfer space connected to the first transfer space extends in a second direction traversing the first direction; a second transfer unit installed in the second barrel body and transferring the hydrogel in the second transfer space; a cutter member installed in the second barrel body and pulverizing the hydrogel transferred by the second transfer unit; and a porous plate for discharging the hydrogel particles pulverized by the cutter member to an outside of the second barrel body.

The second direction in which the second barrel body extends may be orthogonal to a first direction of the first barrel body, and the second barrel body may be formed in a top to bottom direction.

The second direction in which the second barrel body extends may represent a traversing direction in an acute angle range with a first direction of the first barrel body, and the second barrel body may be connected to the first barrel body in an inclined way.

The second direction in which the second barrel body extends may represent a traversing direction in an obtuse angle range with a first direction of the first barrel body, and the second barrel body may be connected to the first barrel body in an inclined way.

The second direction in which the second barrel body extends may represent a gravitational direction, the first direction in which the first barrel body extends may indicate a direction inclined in a ground direction, and the first barrel body may be connected to the second barrel body in an inclined way. A first moving space in which hydrogel particles move may be formed in the first barrel body, and an input unit for inputting the hydrogel particles may be formed on an upper portion of the first barrel body.

The first transfer unit may include a first screw member rotatably installed inside the first transfer space and moving the hydrogel, and a first driving motor for providing a rotation driving force to the first screw member.

The second barrel body may be installed on a lateral side of the first barrel body, a second moving space connected to the first transfer space may be formed in a top to bottom direction, and an outlet for discharging pulverized hydrogel particles may be formed on a lower portion.

The second transfer unit may include a second screw member rotatably installed in the second transfer space and transferring the hydrogel input through the first transfer space in a direction of the outlet, and a second driving motor installed in the second barrel body and providing a rotation driving force to the second screw member.

The cutter member may be rotatably installed in the second screw member at the position of the outlet.

The first driving motor and the second driving motor may have different drive shaft rotation speeds.

A plurality of the cutter members may be installed in the second screw member.

The second barrel body may be rotatably installed in the first barrel body by a driving operation of a driver.

The driver may be installed in the first barrel body, and a load member may be a cylinder member rotatably installed on a lateral side of the second barrel body.

A cover member may be installed around a connection position of the first barrel body and the second barrel body.

According to the embodiment of the present invention, while the outlet for discharging the hydrogel is positioned in the gravitational direction, the porous plate is installed at the position of the outlet so that the hydrogel may be shredded while the hydrogel is uniformly pressurized to the porous plate, thereby uniformly shredding the hydrogel and improving the manufacturing quality of the absorbent polymer.

According to the embodiment of the present invention, the hydrogel is transferred in the gravitational direction and is shredded while passing through the porous plate, so the stable shredding process is allowable while not installing a backflow preventing member for preventing the hydrogel from flowing backward.

According to the embodiment of the present invention, while the outlet for discharging the hydrogel is positioned in an inclined way in a ground direction, the hydrogel is shredded while passing through the porous plate, so the stable shredding process is allowable according to the transferred amount of the hydrogel.

MODE FOR INVENTION

The present invention will be described more fully hereinafter with reference to the accompanying drawings, in which embodiments of the invention are shown. As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification.

Figure 1:
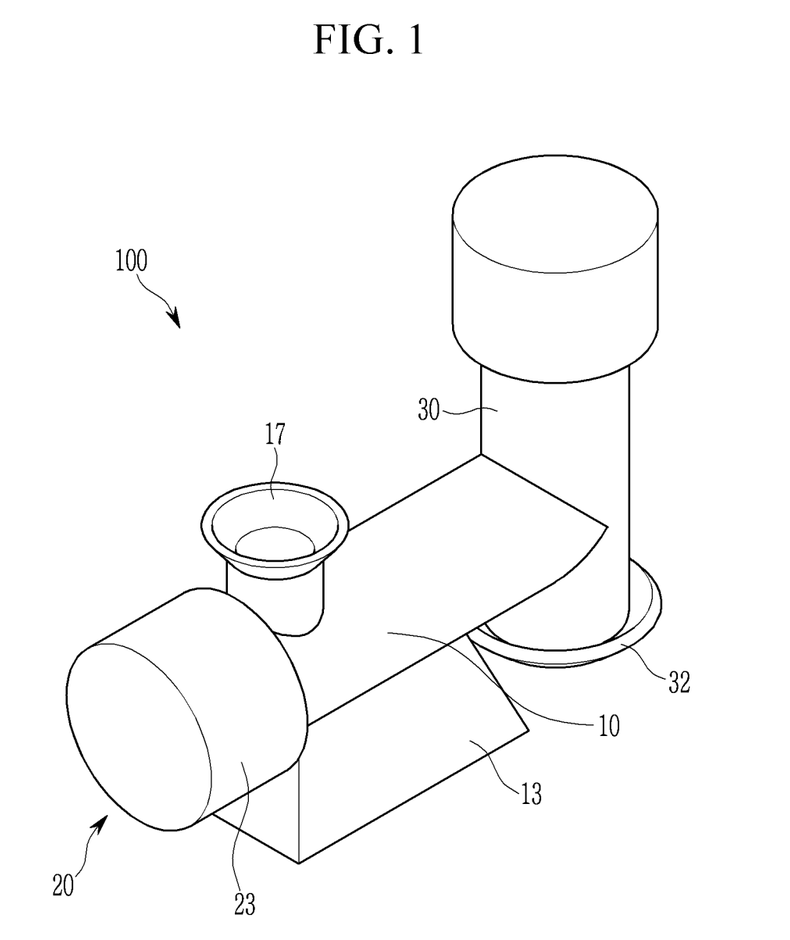
FIG. 1 shows a perspective view of a superabsorbent polymer hydrogel shredding device according to a first example of the present invention.
Figure 2:
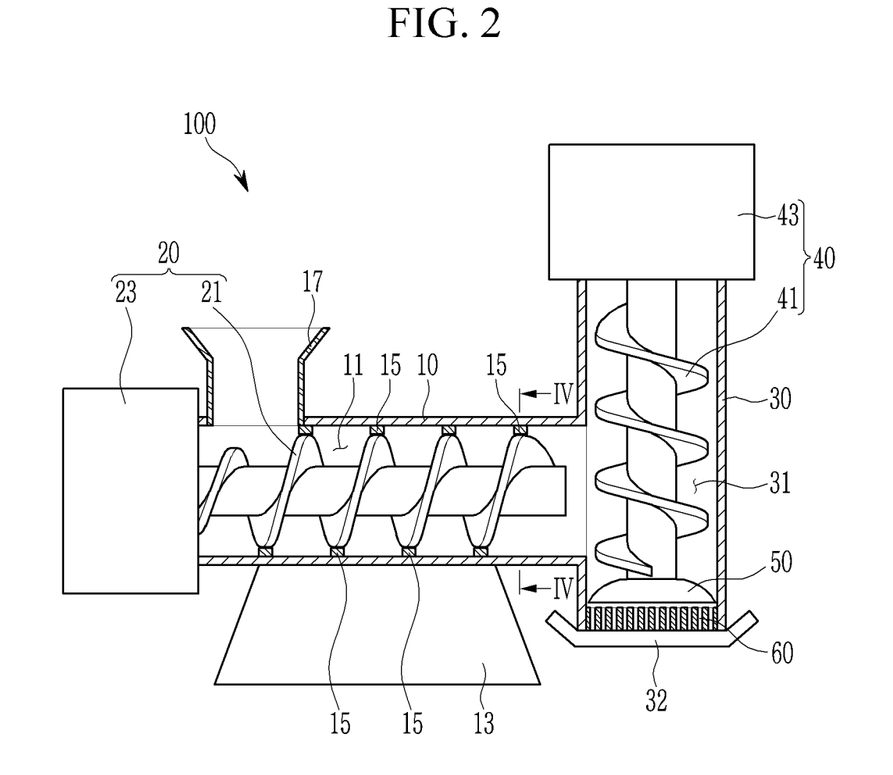
FIG. 2 shows a schematic cross-sectional lateral side view of a superabsorbent polymer hydrogel shredding device described with reference to FIG. 1.
Figure 3:
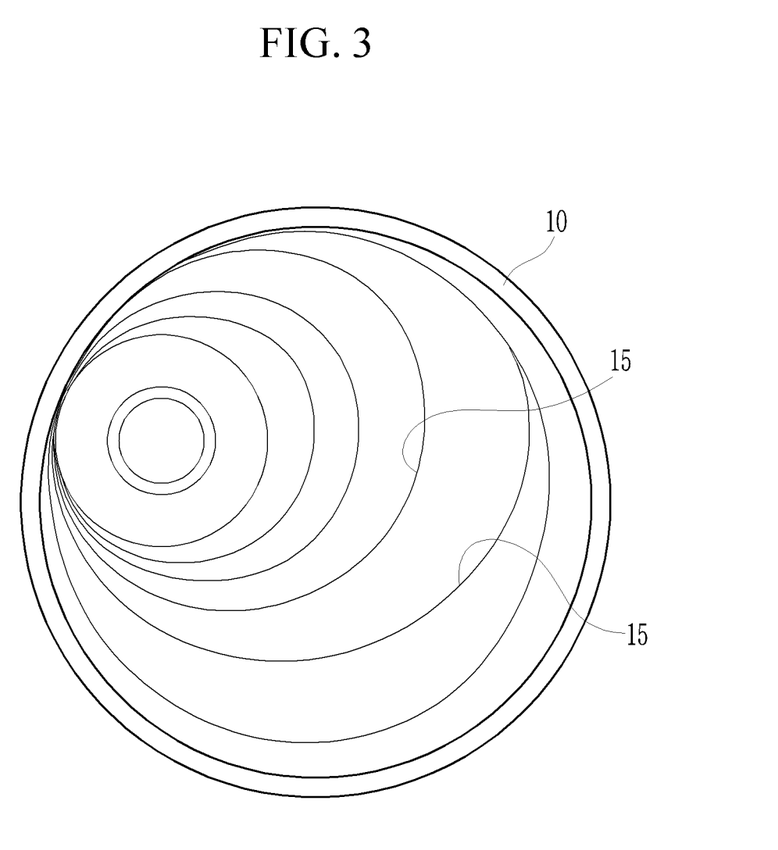
FIG. 3 shows a schematic diagram of a state in which a barrel spiral is formed on an inner wall of a first barrel body described with reference to FIG. 1.
Figure 4:
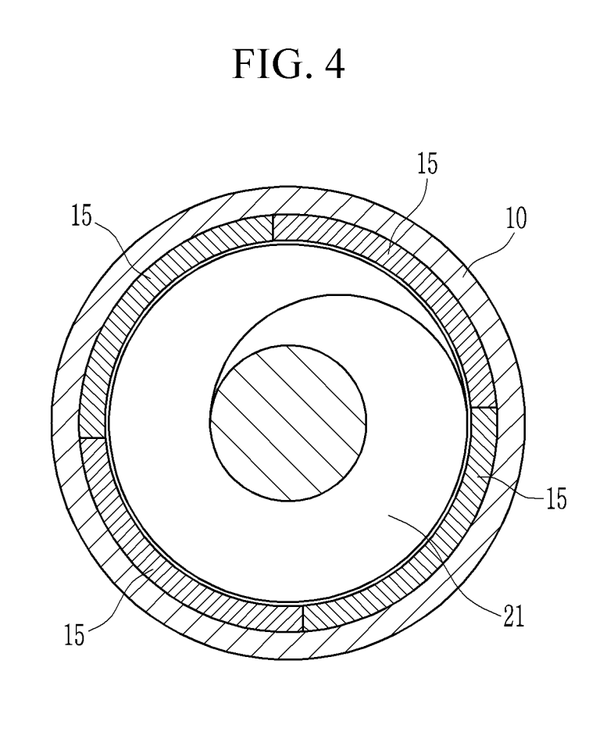
FIG. 4 shows a cross-sectional view with respect to a line IV-IV of FIG. 2.

FIG. 1 shows a perspective view of a superabsorbent polymer hydrogel shredding device according to a first example of the present invention, FIG. 2 shows a schematic cross-sectional lateral side view of a superabsorbent polymer hydrogel shredding device described with reference to FIG. 1, and FIG. 3 shows a schematic diagram of a state in which a barrel spiral is formed on an inner wall of a first barrel body described with reference to FIG. 1. Also, FIG. 4 shows a cross-sectional view with respect to a line IV-IV of FIG. 2.

As shown in FIG. 1 to FIG. 4, the superabsorbent polymer hydrogel shredding device 100 according to a first example of the present invention includes: a first barrel body 10 in which a first transfer space 11 for transferring a hydrogel is formed and which is formed to extend in a first direction; a first transfer unit 20 installed in the first barrel body 10 and transferring the hydrogel in the first transfer space 11; a second barrel body 30 which is installed on a lateral side of the first barrel body 10, in which a second transfer space 31 connected to the first transfer space 11 is formed in a top-to-bottom direction, and which is formed to extend in a second direction traversing the first direction; a second transfer unit 40 installed in the second barrel body 30 and transferring the hydrogel in the second transfer space 31; a cutter member 50 installed in the second barrel body 30 and pulverizing the hydrogel transferred by the second transfer unit 40; and a porous plate 60 for discharging hydrogel particles pulverized by the cutter member 50 to an outside of the second barrel body 30.

The first barrel body 10 in which the first transfer space 11 in which the hydrogel is transferred is formed in a length direction may be installed while supported by a bottom side.

An opened input unit 17 for inputting the hydrogel to the first transfer space 11 may be installed in an upper portion of the first barrel body 10.

A support base portion 13 may protrude on a lower portion of the first barrel body 10 for the purpose of stable support on the bottom side.

The first barrel body 10 may be formed to be long in the first direction while settled on the bottom side. Here, the first direction may be formed to be long in a cylindrical shape while the first barrel body 10 is settled on the bottom side and is parallel to the bottom side.

A barrel spiral 15 may protrude inside the first barrel body 10.

As shown in FIG. 3, the barrel spiral 15 may be formed to protrude in a plurality of spiral shapes in an opposite direction corresponding to the spiral shape of the first screw member 21 on the inner wall side of the first barrel body 10. In the present embodiment, the barrel spiral 15 is exemplified to protrude on the inner wall side of the first barrel body 10, but the present embodiment is not limited thereto, and the barrel spiral 15 may not protrude.

The barrel spiral 15 is not limited to the spiral shape, and it may be modifiable in various ways such as a belt-shaped protrusion with a concentric circle on the inner wall side of the first barrel body 10 or a spherical or angulated protrusion protruding corresponding to the spiral position of the first screw member 21.

As described, the barrel spiral 15 is formed to protrude inside the first barrel body 10, so it is possible to stably transfer the hydrogel without backflow together with an auxiliary shredding operation of the hydrogel.

The hydrogel may be transferred by the transferring operation of the first transfer unit 20 to be described when input into the first barrel body 10 through the input unit 17.

The input unit 17 is formed in an opened state in the upper side of the first barrel body 10, so it may be installed to expand on the upper side so that the hydrogel may be easily input to the inside.

As described, the hydrogel may be transferred in a direction of the second barrel body 30 by a driving force of the first transfer unit 20 when input into the first barrel body 10.

The first transfer unit 20 is installed in the first barrel body 10, and it may be installed to provide a transfer driving force for transferring the hydrogel.

In detail, the first transfer unit 20 may include a first screw member 21 rotatably installed inside the first transfer space 11 and moving the hydrogel, and a first driving motor 23 for providing the rotation driving force to the first screw member 21.

The first screw member 21 is rotatably installed in the length direction of the first transfer space 11 inside the first barrel body 10, and it may be installed to be rotated by a driving operation of the first driving motor 23 and to transfer the hydrogel charged in the first transfer space 11 in the direction of the second barrel body 30.

The first driving motor 23 is installed in the first barrel body 10, while a drive shaft is installed in one end of the first screw member 21, and may be installed to provide a rotation driving force by rotating the first screw member 21 in one direction so that the hydrogel may be transferred at an appropriate transferring rate in the first barrel body 10.

The first driving motor 23 and the first screw member 21 may be installed to transmit the rotation driving force through a decelerator (not shown).

The second barrel body 30 may be installed on a lateral side of the first barrel body 10.

The second barrel body 30 may be formed in a second direction traversing the first direction in which the first barrel body 10 is installed on the lateral side of the first barrel body 10.

The second direction in which the second barrel body 30 is installed in the first barrel body 10 may be formed to be orthogonal to the first direction that is parallel to the bottom side and to face the bottom side in the present embodiment.

However, while the second direction of the second barrel body 30 is formed to be a direction that is orthogonal to the first direction, the embodiment is not limited thereto, and it is also possible to appropriately modify it into a traversing angle in the range of an acute angle or an obtuse angle with respect to the first direction. This will be described in detail according to a third example and a fourth example.

The second barrel body 30 is installed to be perpendicular to the length direction of the first barrel body 10 on the lateral side of the first barrel body 10 in the first example, which is to change a moving direction of the hydrogel particles transferred in the first transfer space 11 into the gravitational direction.

Therefore, the hydrogel particles move in the gravitational direction in the second transfer space 31 of the second barrel body 30, so it is possible to supply them to the porous plate 60 with a uniform pressure. This will be described in detail while the porous plate 60 is described.

The second transfer unit 40 for transferring the hydrogel transferred to the second transfer space 31 in the direction of an outlet 32 may be installed on the second barrel body 30.

The second transfer unit 40 may include a second screw member 41 rotatably installed in the second transfer space 31, and a second driving motor 43 for providing a rotation driving force to the second screw member 41.

The second screw member 41 is installed to be long in the length direction of the second barrel body 30 inside the second transfer space 31, and it may be installed to transfer the hydrogel transferred to the second transfer space 31 through the first transfer space 11 in the direction of the outlet 32.

The second driving motor 43 is installed in the upper side of the second barrel body 30, and it may be installed so that the drive shaft may be connected to an end of the second screw member 41 to provide a rotation driving force to the second screw member 41.

The second driving motor 43 and the second screw member 41 may be installed to transmit the rotation driving force through a decelerator (not shown).

In addition, the cutter member 50 may be installed in the second screw member 41 so that it may rotate as the second screw member 41 rotates.

The cutter member 50 is rotatably installed on the position of the outlet 32 formed in the second barrel body 30 on the second screw member 41, and it may be installed to appropriately pulverize the hydrogel transferred from the second transfer space 31 by the second screw member 41.

In the present embodiment, one cutter member 50 will be exemplified to be installed in the end of the second screw member 41. However, the cutter member 50 is not limited to be installed in the end of the second screw member 41, and it is also possible for at least two cutter members 50 to be installed corresponding to a transferring amount of the hydrogel.

The first driving motor 23 and the second driving motor 43 may be driven at different rotation rates with each other.

That is, it is possible to differentiate the transferring rate for the hydrogel to move in the first barrel body 10 by driving the first driving motor 23 and the transferring rate for the hydrogel to be transferred in the direction of the porous plate 60 in the second barrel body 30 by driving the second driving motor 43.

Therefore, the first driving motor 23 and the second driving motor 43 are operated so that the hydrogel may be supplied to the porous plate 60 installed in the gravitational direction at a further stable rate, so the hydrogel may be further stably transferrable.

The hydrogel pulverized by the cutter member 50 may be extruded and discharged by the porous plate 60.

The porous plate 60 is installed at the position of the outlet 32 of the second barrel body 30, and a plurality of shredding holes may be formed therein. Hence, the hydrogel pulverized by the cutter member 50 is pressurized and moved inside the second barrel body 30 by a pressurizing force generated by a rotation operation of the second screw member 41, so it may be stably discharged through the shredding holes in the porous plate 60.

The porous plate 60 is made of a heat-treated metal material, so it may stably support the pressurizing force for transferring the hydrogel.

Here, the second barrel body 30 is installed to be perpendicular to the first barrel body 10 so that it may face the gravitational direction, so the pressurizing force generated by the rotation operation of the second screw member 41 may be uniformly applied to a surface of the porous plate 60.

Therefore, the hydrogel is transferred in the second transfer space 31 of the second barrel body 30 and is uniformly pressurized on the surface of the porous plate 60, so it is possible for the hydrogel to pass through the shredding holes of the porous plate 60 and be uniformly shredded.

As described above, the hydrogel shredding device 100 according to the present embodiment may allow the hydrogel to pass through the porous plate 60 and be shredded while the first barrel body 10 for transferring the hydrogel in the first place and the second barrel body 30 for allowing the outlet 32 to face the gravitational direction is installed on a lateral side of the first barrel body 10. Therefore, the hydrogel is shredded while uniformly pressurized to the porous plate 60 so the hydrogel may be uniformly shredded, and the manufacturing quality of the absorbent polymer may be improved.

In addition, the hydrogel is transferred from the second barrel body 30 installed in the gravitational direction, passes through the porous plate 60, and is shredded, so the hydrogel may be stably shredded without installing an additional backflow preventing member.

Figure 5:
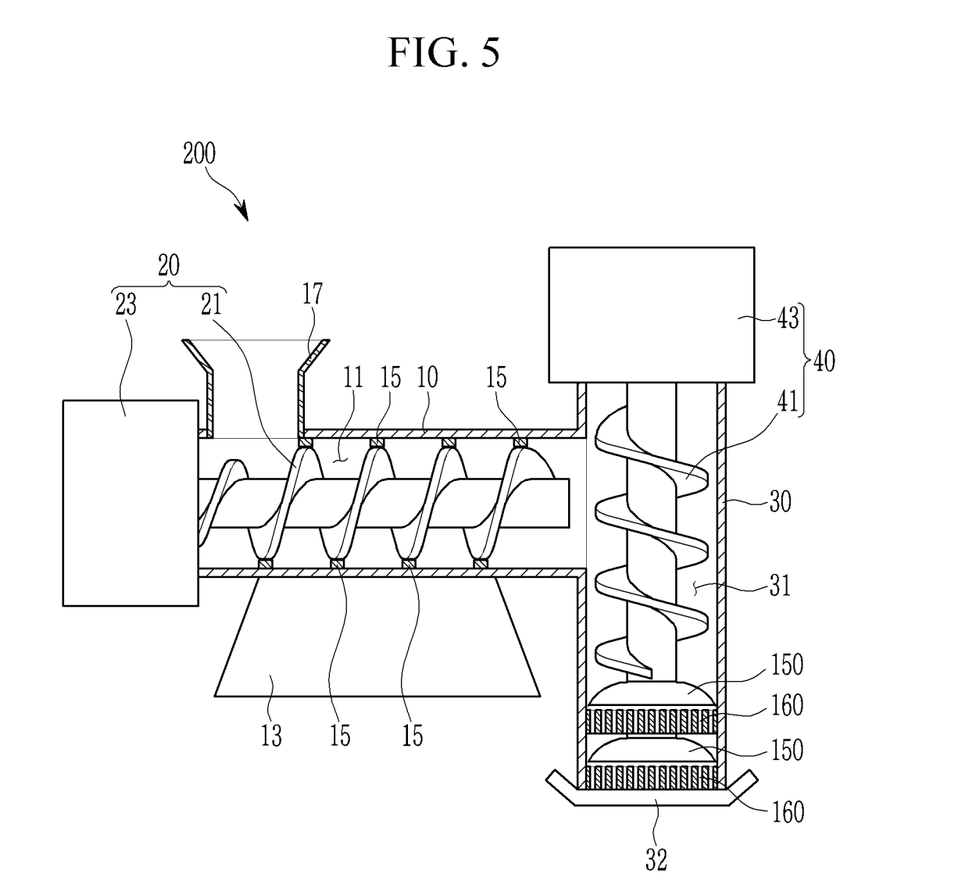
FIG. 5 shows a schematic cross-sectional lateral side view of a superabsorbent polymer hydrogel shredding device according to a second example of the present invention.

FIG. 5 shows a schematic cross-sectional lateral side view of a superabsorbent polymer hydrogel shredding device according to a second example of the present invention. The same reference numerals as those given in FIG. 1 to FIG. 4 represent the same or similar members with the same or similar functions. Those with the same reference numerals will not be described.

As shown in FIG. 5, a plurality of the cutter members 150 and the porous plates 160 of the hydrogel shredding device 200 according to a second example of the present invention may be installed on the second screw member 41.

Therefore, it is possible to pulverize the hydrogel by use of a plurality of cutter members 150 according to the rotation operation of the second screw member 41, so it is possible to efficiently pulverize the hydrogel.

Figure 6:
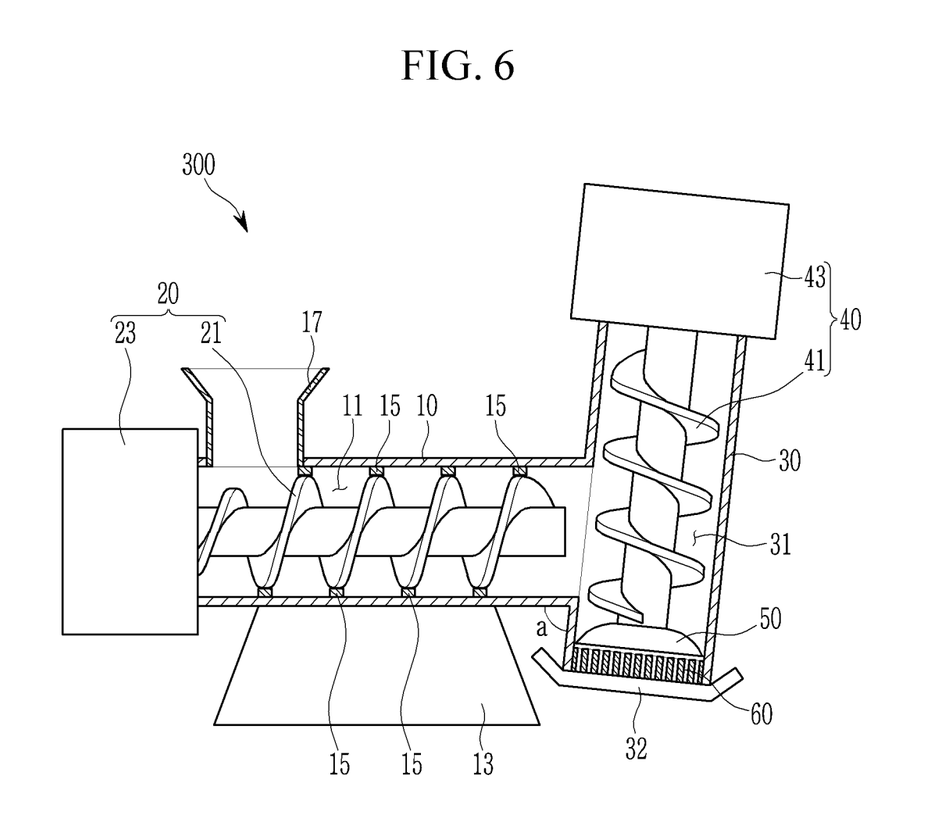
FIG. 6 shows a schematic cross-sectional lateral side view of a superabsorbent polymer hydrogel shredding device according to a third example of the present invention.

FIG. 6 shows a schematic cross-sectional lateral side view of a superabsorbent polymer hydrogel shredding device according to a third example of the present invention. The same reference numerals as those given in FIG. 1 to FIG. 5 represent the same or similar members with the same or similar functions. Those with the same reference numerals will not be described.

As shown in FIG. 6, the first barrel body 30 of the hydrogel shredding device 300 according to a third example of the present invention may extend in a first direction that is parallel to the bottom side, and the second barrel body 30 may extend in a second direction traversing the first direction from the lateral side of the first barrel body 10 and may be formed to be inclined with respect to the bottom side.

In the third example, the second direction generated by extending the second barrel body 30 may be connected to the first direction generated by extending the first barrel body 10 with an acute angle (a) in an inclined way.

As described, the second barrel body 30 is formed to be inclined with respect to the first barrel body 10 at an acute angle, so the hydrogel is transferred in an inclined way in the second transfer space 31 of the second barrel body 30 and is pressurized on the surface of the porous plate 60, and it is possible to allow the hydrogel to pass through the shredding holes of the porous plate 60 and be uniformly shredded.

Therefore, the hydrogel is moved along the internal space, inclined with an acute angle, of the second barrel body 30 and is shredded on the porous plate 60, so the hydrogel may be stably shredded while it is not steeply lowered.

Figure 7:
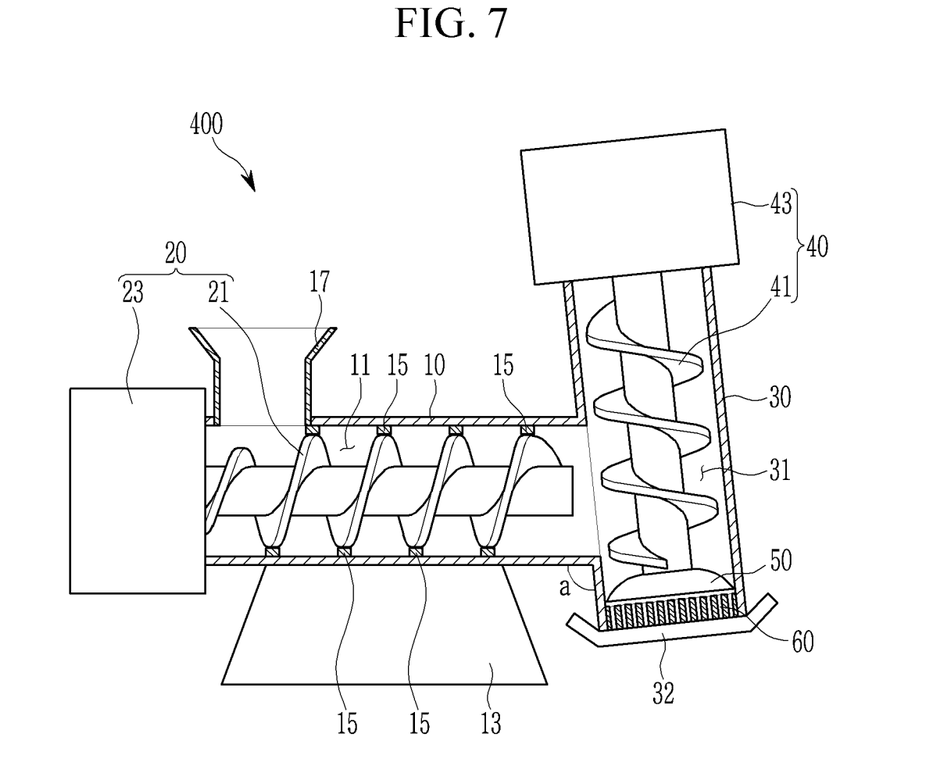
FIG. 7 shows a schematic cross-sectional lateral side view of a superabsorbent polymer hydrogel shredding device according to a fourth example of the present invention.

FIG. 7 shows a schematic cross-sectional lateral side view of a superabsorbent polymer hydrogel shredding device according to a fourth example of the present invention. The same reference numerals as those given in FIG. 1 to FIG. 6 represent the same or similar members with the same or similar functions. Those with the same reference numerals will not be described.

As shown in FIG. 7, the first barrel body 30 of the hydrogel shredding device 400 according to a fourth example of the present invention may extend in the first direction in parallel with the bottom side, and the second barrel body 30 may extend in the second direction traversing the first direction from the lateral side of the first barrel body 10, and they may be formed to be inclined with respect to the bottom side.

In the fourth example, the second direction in which the second barrel body 30 extends may be connected to the first direction in which the first barrel body 10 extends at an obtuse angle.

Therefore, the hydrogel is moved along the internal space, inclined with an obtuse angle, of the second barrel body 30 and is shredded on the porous plate 60, so the hydrogel may be stably shredded while it is not steeply lowered.

Figure 8:
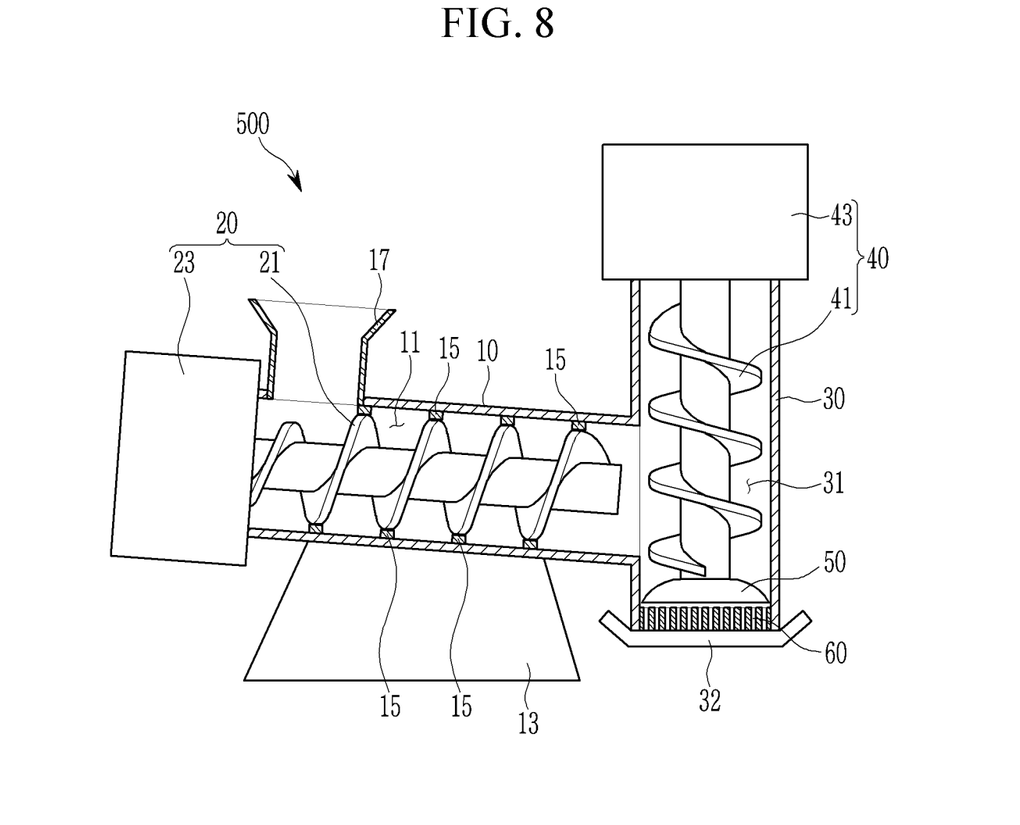
FIG. 8 shows a schematic cross-sectional lateral side view of a superabsorbent polymer hydrogel shredding device according to a fifth example of the present invention.

FIG. 8 shows a schematic cross-sectional lateral side view of a superabsorbent polymer hydrogel shredding device according to a fifth example of the present invention. The same reference numerals as those given in FIG. 1 to FIG. 7 represent the same or similar members with the same or similar functions. Those with the same reference numerals will not be described.

As shown in FIG. 8, the first direction in which the first barrel body 30 of the hydrogel shredding device 500 according to a fifth example of the present invention extends may extend may be inclined in the ground direction.

The second direction in which the second barrel body 30 extends may be formed to be long to be perpendicular to the ground.

That is, the first barrel body 10 is formed to be inclined with respect to the ground, and the second barrel body 30 is formed to be perpendicular to the ground, so the first barrel body 10 and the second barrel body 30 may be connected to each other in an inclined way.

As described, as the first barrel body 10 is formed to be inclined in the ground direction, the hydrogel may be further actively moved.

Figure 9:
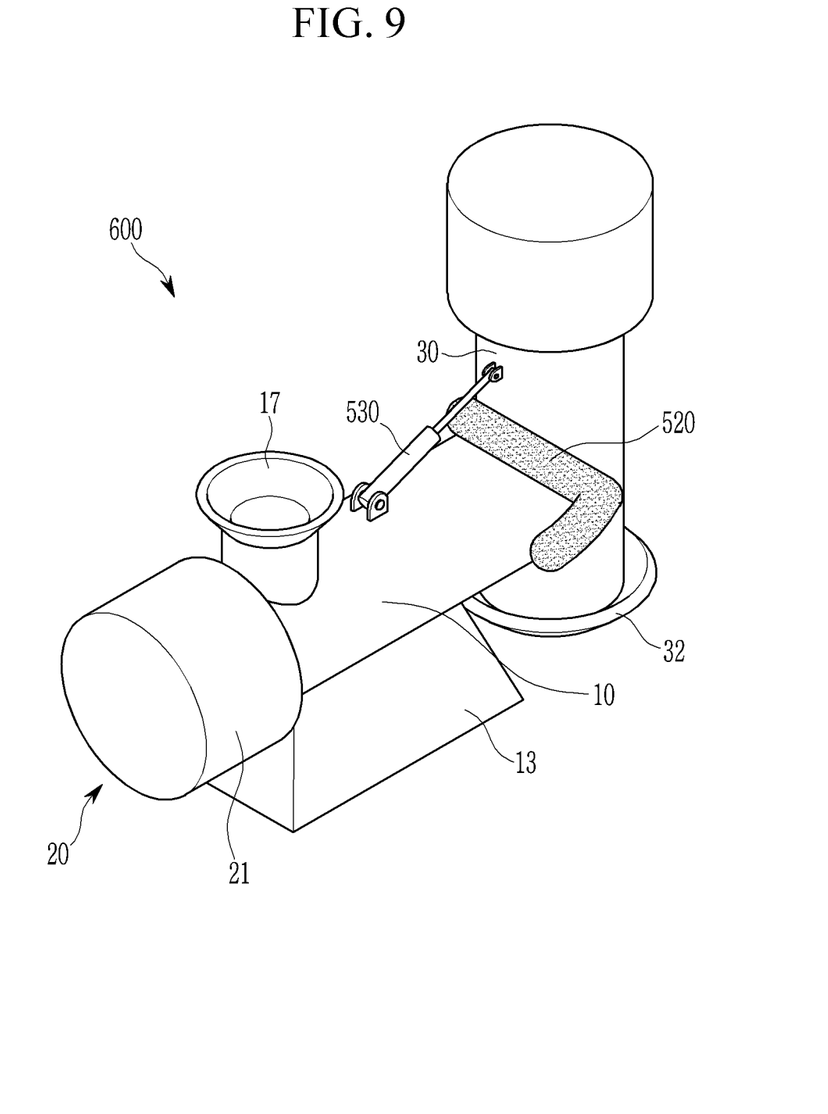
FIG. 9 shows a perspective view of a superabsorbent polymer hydrogel shredding device according to a sixth example of the present invention.
Figure 10:
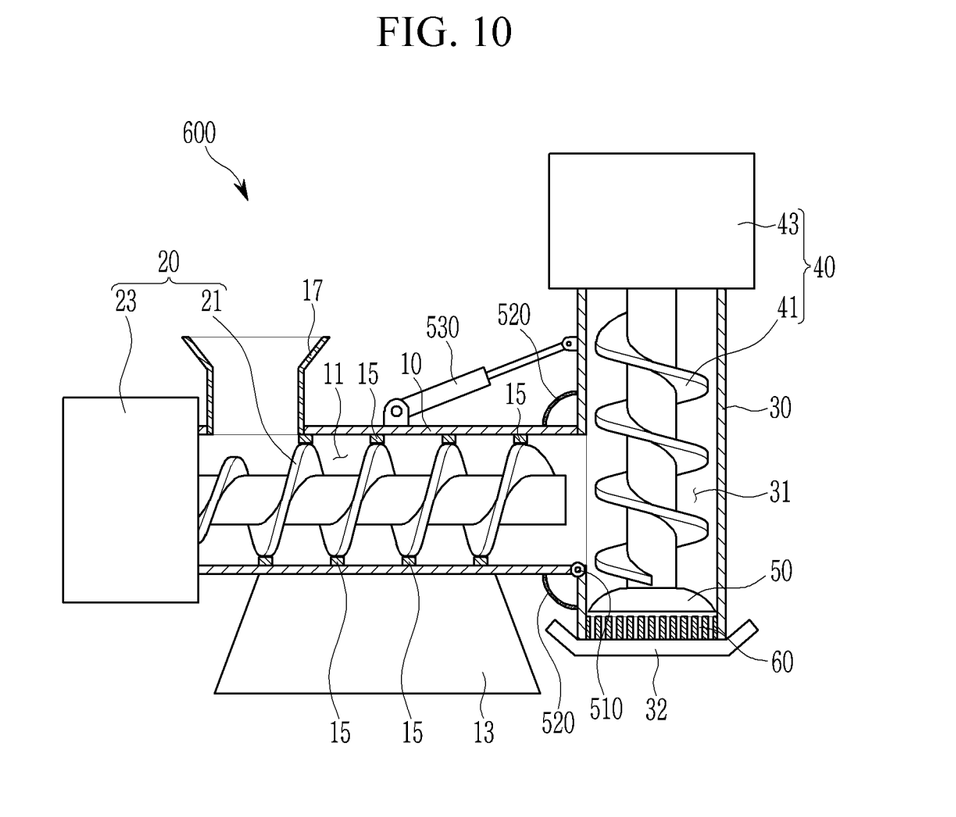
FIG. 10 shows a schematic cross-sectional lateral side view of a superabsorbent polymer hydrogel shredding device described with reference to FIG. 9.

FIG. 9 shows a perspective view of a superabsorbent polymer hydrogel shredding device according to a sixth example of the present invention, and FIG. 10 shows a schematic cross-sectional lateral side view of a superabsorbent polymer hydrogel shredding device described with reference to FIG. 9. The same reference numerals as those given in FIG. 1 to FIG. 8 represent the same or similar members with the same or similar functions. Those with the same reference numerals will not be described.

As shown in FIG. 9 and FIG. 10, regarding the hydrogel shredding device 600 according to a sixth example of the present invention, the second barrel body 30 may be rotatably installed in the first barrel body 10.

That is, part of the second barrel body 30 may be rotatably installed in the first barrel body 10 by a hinge 510. A cover member 520 made of a flexible material may be connected between the second barrel body 30 and the first barrel body 10. Here, the second barrel body 30 is a predetermined support member for supporting an installed load and it may be supported on the bottom side.

In another way, a rotation angle of the second barrel body 30 is adjustable by a driver 530 such as a cylinder member.

As described, the rotation angle by which the second barrel body 30 is installed in the first barrel body 10 is adjustable, so the hydrogel may be fluently shredded by adjusting the transfer angle corresponding to the transferred amount of the hydrogel.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10 . . . first barrel body 11 . . . first transfer space
13 . . . support base portion 15 . . . barrel spiral
17 . . . input unit 20 . . . first transfer unit
21 . . . first screw member 23 . . . first driving motor
30 . . . second barrel body 31 . . . second transfer space
40 . . . second transfer unit 41 . . . second screw member
43 . . . second driving motor 50, 150 . . . cutter member
60, 160 . . . porous plate 510 . . . hinge
520 . . . cover member 530 . . . driver

The invention claimed is:

1. A hydrogel shredding device comprising:
   a first barrel body in which a first transfer space for transferring a hydrogel is formed to extend in a first direction;
   a first transfer unit installed on the first barrel body, configured to transfer the hydrogel in the first transfer space;
   a second barrel body installed on a lateral side of the first barrel body, and in which a second transfer space connected to the first transfer space extends in a second direction traversing the first direction;
   a second transfer unit installed in the second barrel body, configured to transfer the hydrogel in the second transfer space;
   a cutter member installed in the second barrel body, configured to pulverize the hydrogel transferred by the second transfer unit, to form pulverized hydrogel particles;
   a porous plate for discharging the pulverized hydrogel particles to an outside of the second barrel body; and
   wherein the second barrel body is rotatably installed on the first barrel body by a driver.

2. The hydrogel shredding device of claim 1, wherein a first moving space in which hydrogel particles move is formed in the first barrel body, and an input unit for inputting the hydrogel particles is formed on an upper portion of the first barrel body.

3. The hydrogel shredding device of claim 2, wherein the first transfer unit includes
   a first screw member rotatably installed inside the first transfer space, configured to move the hydrogel, and
   a first driving motor configured to provide a rotation driving force to the first screw member.

4. The hydrogel shredding device of claim 3, wherein the second barrel body is installed on a lateral side of the first barrel body, a second moving space connected to the first transfer space is formed in a top to bottom direction, and an outlet for discharging pulverized hydrogel particles is formed on a lower portion.

5. The hydrogel shredding device of claim 4, wherein the second transfer unit includes
   a second screw member rotatably installed in the second transfer space, configured to transfer the hydrogel input through the first transfer space in a direction of the outlet, and
   a second driving motor installed in the second barrel body, configured to provide a rotation driving force to the second screw member.

6. The hydrogel shredding device of claim 5, wherein the cutter member is rotatably installed in the second screw member at a position of the outlet.

7. The hydrogel shredding device of claim 6, wherein the first driving motor and the second driving motor have different drive shaft rotation speeds.

8. The hydrogel shredding device of claim 7, wherein a plurality of the cutter members are installed in the second screw member.

9. The hydrogel shredding device of claim 1, wherein the driver is installed on the first barrel body, and a load member of the driver rotatably installed on a lateral side of the second barrel body.

10. The hydrogel shredding device of claim 9, wherein a cover member is installed around a connection position of the first barrel body and the second barrel body.

* * * * *